Jan. 7, 1958     A. T. KOLTHOFF ET AL     2,818,649
TROUSER DRAFTING SLIDE RULE
Filed Oct. 30, 1951     3 Sheets-Sheet 1
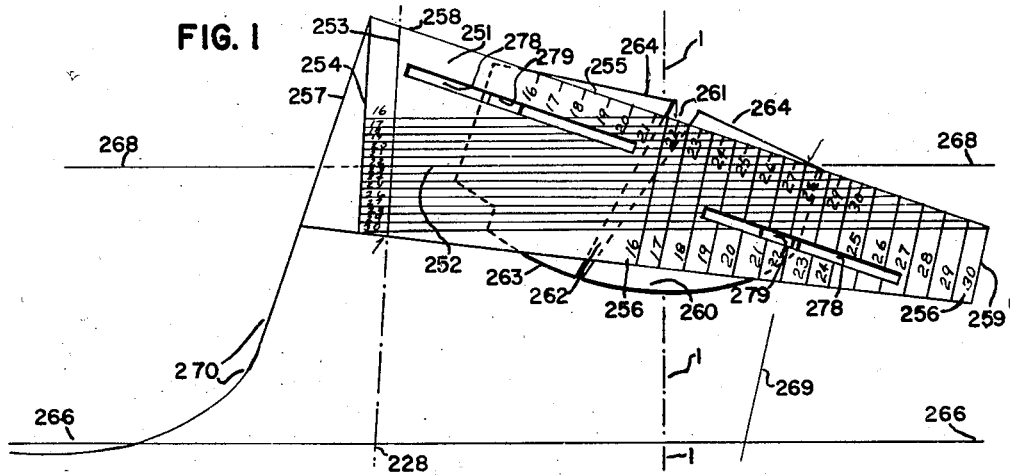
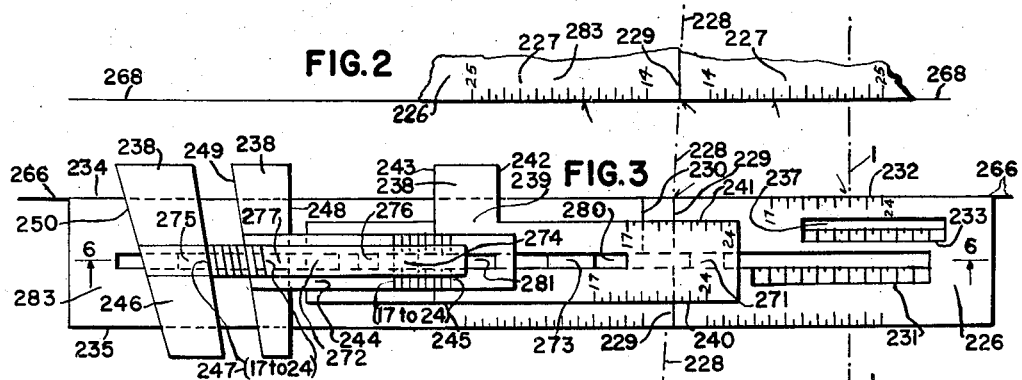
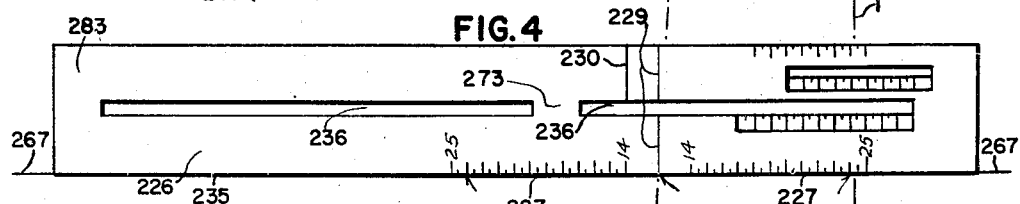
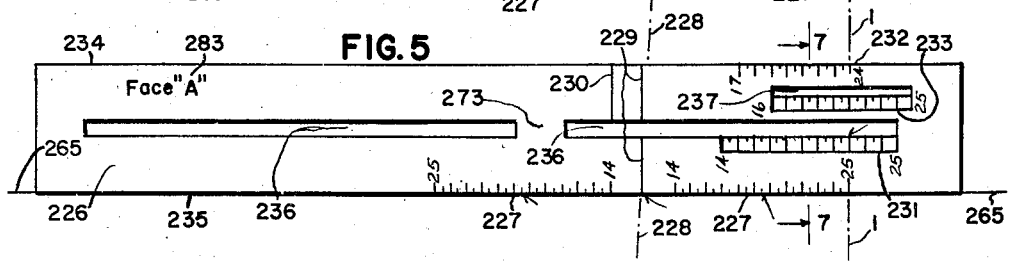
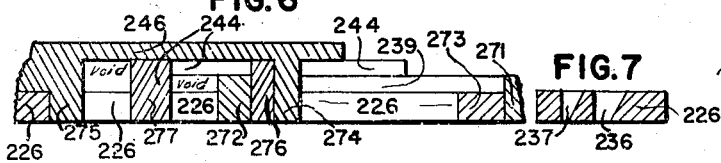
INVENTORS
Aage Thorwald Kolthoff
Hubert Louis Taylor Jan. 7, 1958 A. T. KOLTHOFF ET AL 2,818,649
TROUSER DRAFTING SLIDE RULE
Filed Oct. 30, 1951 3 Sheets-Sheet 2
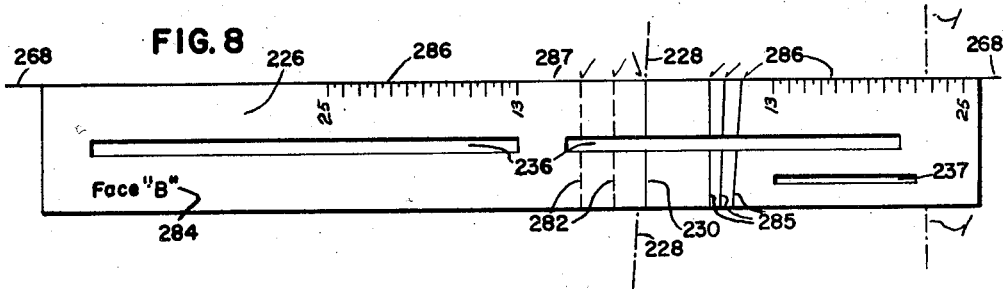
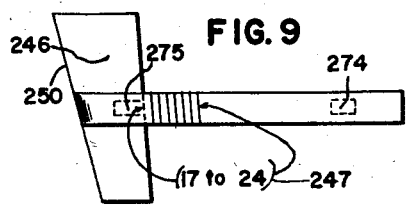
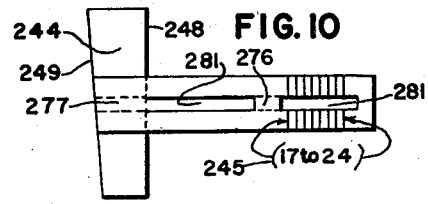
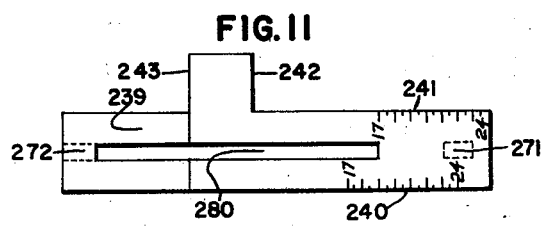
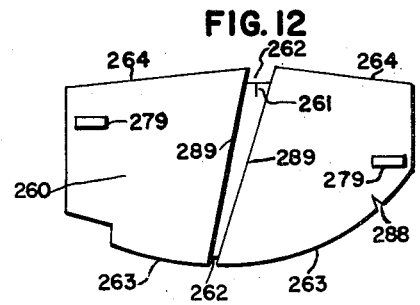
INVENTORS
Aage T. Kolthoff
Hubert Louis Taylor

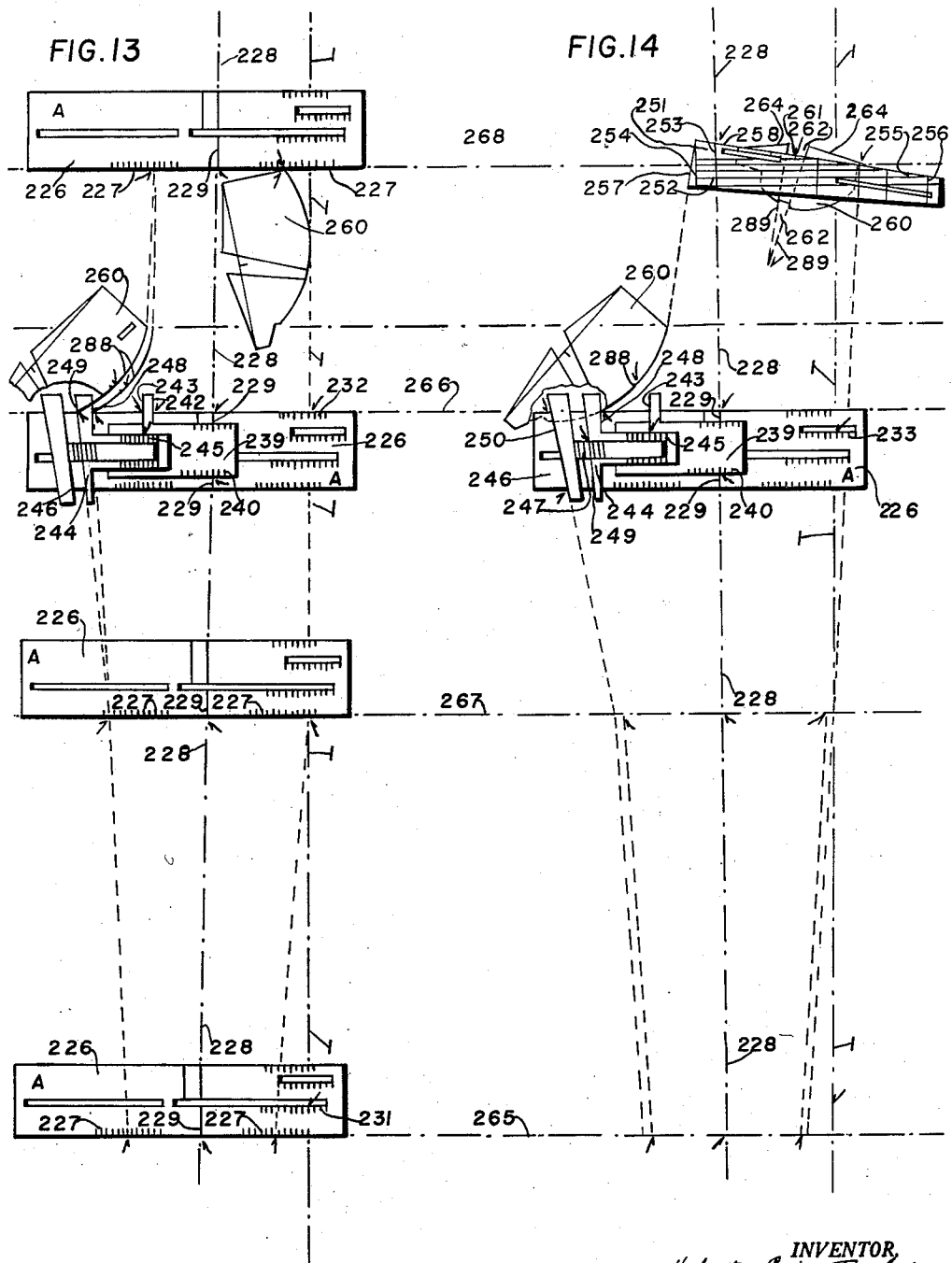

United States Patent Office 2,818,649
Patented Jan. 7, 1958

2,818,649
TROUSER DRAFTING SLIDE RULE

Aage T. Kolthoff and Hubert Louis Taylor, New York, N. Y.

Application October 30, 1951, Serial No. 253,774

4 Claims. (Cl. 33—11)

This invention relates to slide rules, but particularly to slide rules for use by tailors in drafting trousers. The objects of the trouser drafting slide rule are: (1) reduce the time required for drafting a trouser by other methods to about ⅛ that time; (2) eliminate most of the danger of error resulting from the calculations and measurements necessary when drafting a trouser by other methods; (3) to standardize and make possible the continuous reproduction of any previous draft or any feature in it, by merely referring to a record kept of the numeral settings used on the trouser drafting slide rule when the previous draft or feature was made by means of the trouser drafting slide rule; (4) clarify and simplify the techniques of drafting a trouser; (5) produce a slide rule with most of its parts transparent so that the material the draft is being made on can be seen through it; and having some part so pigmented that scales can be placed on both sides without interference or confusion to the user. (6) produce a set of slide rules so made that all the parts are replaceable. (7) A set of slid rules that are compact, strong, light, and flexible. (8) A set of slide rules having a color scheme such that any part or scale can be distinguished from any other part or scale. (9) A set of slide rules having its scales marked on the underside of all transparent parts to avoid shadows of the scales which can be mistaken for the scales. (10) A set of slide rules with parts so arranged, shaped, and proportioned that on their scales can be set a number that is half or a fraction of the measurement, or the measurement number itself (according to what is needed), and from the position of the parts indicated by the scales, the tailor be able to obtain the draft of the desired trouser, by merely putting check marks at the desired numbers of the scales, and at some places of the rules; and also marking along certain edges of the rules to give an almost completed draft. After this, the tailor must connect a few lines only to get his draft. (11) A set of slide rules easily assembled or disassembled, that is capable of producing drafts of standard or irregular sized trousers.

If for example, a tailor had the following measurements: length 44", inseam 31", seat 44", waist 36", knee 24", bottom 19½", he could lay off the length along the construction line of the draft, then locate the draft finished length line; the knee line, the crotch line; and the waist line. On the midway proportion symmetrical scale of the trouser forepart drafting slide rule basic rule he could set 19½ when it is placed along the draft finished length line. When it is placed along the knee line, he could set 24 on the same scale. When it is on the crotch line, he could set 22 on the regular seat width proportion scale, also on the dressing proportion scale, and also on the crotch proportion scale. When it is on the waist line he could set 18 on the midway symmetrical proportion scales. The inseam distance is laid off according to tailoring principles. Then by placing the trouser backpart height-width drafting slide rule scale, bearing slide and the V suppression slide on the waist line, with the V suppression scale matching line, matching 22 on the V suppression scale; line 22 of the back height proportion scale is made to coincide with the waist line. Then line 22 of the back width proportion scale is prolonged towards the crotch line. By marking at these settings and connecting the markings, the draft of the trouser is produced.

To further show how these objectives are attained, an example of drafting a trouser is used, and a more detailed description is given to accompany the drawing of the trouser drafting slide rule, which is comprised of two separate slide rules namely, the "trouser forepart drafting slide rule" and the 'trouser backpart height-width drafting slide rule," whose interdependency for drafting a trouser will be apparent from the description and figures in which:

Fig. 1 is a plan view of the trouser backpart height-width drafting slide rule shown placed with line 22 of the back height proportion scale on the draft waist line, and with its regular midway line on the draft trouser midway line, so shown for the purpose of illustrating the use and function of the rule.

Fig. 2 is a fragmentary plan view of the trouser forepart drafting slide rule basic rule, showing the midway symmetrical proportion scale lying along the draft waist line, with the basic rule midway line matching the draft midway line only at the point where the draft midway line crosses the draft waist line.

Fig. 3 is a plan view of the trouser forepart drafting slide rule complete, shown placed with the right edge of the top face of the basic rule matching the draft crotch line, and its parts set to the settings for the drafting illustration being used.

Fig. 4 is a plan view of the trouser forepart drafting slide rule, basic rule shown placed with the left edge of the top face matching the draft knee line, and its midway line matching the draft midway line only at the point where the draft midway line crosses the draft knee line.

Fig. 5 is a plan view showing the top face of the trouser forepart drafting slide rule basic rule, shown placed with its left edge matching the draft finished length line, and its midway line matching the draft midway line only at the point where the draft midway line crosses the draft finished length line.

Fig. 6 is a fragmentary transverse elevation sectional view of Fig. 3 taken in the plane indicated by the line 6—6 of Fig. 3 and shows the arrangement of the parts mounted on the basic rule of the slide rule. The mounted parts are shown in the position for the maximum size trouser.

Fig. 7 is a transverse elevation sectional view of Fig. 5 taken in the plane indicated by the line 7—7 of Fig. 5 and shows the slant faced slots cut for marking along the draft midway determination proportion scale and the side back proportion scale of the basic rule.

Fig. 8 is a plan view showing the bottom face of the trouser forepart drafting slide rule basic rule, shown placed with the right edge of the bottom face matching the draft forepart waist line, and its pleat midway line matching the draft midway line only at the point where the draft midway line crosses the draft forepart waist line.

Fig. 9 is a plan view of the trouser forepart drafting slide rule crotch line T-shaped backpart slide, alone, showing also the backpart slide crotch proportion scale, and the tongues.

Fig. 10 is a plan view of the trouser forepart drafting slide rule crotch line T-shaped crotch forepart slide, alone, showing also the crotch forepart slide dressing proportion scale, the groove and the tongues.

Fig. 11 is a plan view of the trouser forepart drafting slide rule crotch line seat width slide, alone, showing also its regular seat width proportion scale, its pleated seat width proportion scale, its tongues and groove.

Fig. 12 is a plan view of the trouser backpart height-width drafting slide rule, V suppression slide, alone, showing also its tongues, the V suppression lines, and the fly notch.

Fig. 13 is the draft of the forepart and Fig. 14 is the draft of the backpart of a regular trouser having the following measurements: length 44, in seam 31, seat 44, waist 36, knee 24, bottom 19½.

In order that the detailed description that follows be more easily understood, when the detailed reference is made to the principal figures (Figs. 1, 3, and 5), the mechanical functioning of the mechanism in the figure will be explained first, then will follow explanation concerning the use and application of the mechanism.

Before the trouser drafting slide rule can be used, the tailor must have a set of measurements, e. g., length 44"; inseam 31"; seat 44"; waist 36"; knee 24"; bottom 19½". Then on the material the draft is to be made on, he marks the draft construction line 1 (shown as a dash-dot line). Along this line he lays off the length 44". At the left end of the length, the draft finished length line, 265, is constructed at right angles to the draft construction line 1. Then from the inseam measurement the distance from the draft finished length line, 265, to the draft knee line 267, is computed. The draft knee line 267 is then constructed at right angles to the draft construction line 1. The draft crotch line 266, is constructed at right angles to the draft construction line 1, 31" to the right of the draft finished length line 265. At the right end of the length 44"; the draft waist line 268 is constructed at right angles to the draft construction line 1.

Referring first to Fig. 5, the trouser forepart drafting slide rule basic rule 226, is opaque and has a long groove 236, in which runs the tongues of the mounted parts shown in Figs. 3, 6, 9, 10, 11. Through one long groove 236, the tailor can mark on his draft the measurements from the basic rule draft midway determination scale 231. Through the basic rule short groove 237, he can mark on the draft the measurements from the basic rule slide back proportion scale 233. The basic rule midway line 229, is marked on the top face 283, of the rule. The position of the basic rule midway line 229, determines the location of points for drawing-in the draft midway line 228. The basic rule draft midway determination proportion scale 231, and the basic rule side back proportion scales are marked on slant faces as shown in Fig. 7 where the long groove 236 and the short groove 237 openings are shown. All scales are numbered throughout, although, to avoid confusion, they are not so shown on the drawings.

To begin using the basic rule 226, the left edge 235 of the top face 283 of the basic rule 226 is placed on the draft finished length line 265. The rule is moved up and down along the draft finished length line 265 until mark 22 on the basic rule's draft midway determination proportion scale 231, coincides with the draft construction line 1. This locates the position of the basic rule midway line 229 on the draft. A mark is put on the draft finished length line 265, opposite the basic rule's midway line 229, to establish a point on the draft midway line 228 at the draft finished length line 265.

The bottom width is next established by putting a check mark on the draft finished length line 265, opposite mark 19½ on each of the scales of the basic rule midway symmetrical proportion scale 227. The basic rule 226 may now be removed.

Referring next to Fig. 3, the basic rule 226 is placed so that the right edge 234 of the top face coincides with the draft crotch line 266. It is moved up and down the draft crotch line 266 until mark 22 on the basic rule side front proportion scale 232, coincides with the draft construction line 1. This locates the position of the basic rule midway line 229, at the draft crotch line 266. A check mark is put on the draft crotch line 266 opposite the basic rule midway line 229, to establish a point on the draft midway line 228 at the draft crotch line 266. After this, the three crotch line proportion slides 238 that complete the make-up of the trouser forepart drafting slide rule, are mounted on the basic rule 226.

These parts function mechanically as follows: the trouser forepart drafting slide rule seat width slide 239 shown in Figs. 3, 6, and 11, slides on the basic rule 226, and is guided and held to the basic rule 226 by the seat width slide front tongue 271, and the seat width slide rear tongue 272. The limits of motion of the seat width slide 239, on the basic rule 226 is controlled by the basic rule seat width slide stop 273, shown in Figs. 3, 4, 5, 6, and 8. When the seat width slide 239 is slid back and forth on the basic rule 226, its front and rear tongues 271 and 272 respectively meet the stop 273, limiting the motion of the seat width slide 239. The seat width slide 239, has a groove 280, in which runs the crotch forepart slide front tongue 276 and the backpart slide front tongue 274, also shown in Figs. 9 and 10.

The trouser forepart drafting slide rule, crotch forepart slide 244, shown in Figs. 3, 6 and 10 slides partly on the basic rule 226, and partly on the seat width slide 239. The crotch forepart slide front tongue 276, runs in the seat width slide groove 280 and in the basic rule long groove 236, and limits the motion of the crotch forepart slide 244 when moved in the direction of increasing measurement. The crotch forepart slide dressing take out edge 248, by butting to the edge of the seat width slide 239, limits the motion of the crotch forepart slide 244, when it is moved in the direction of decreasing measurement. The crotch forepart slide rear tongue 277, which is located under that part of the crotch forepart slide 244, that slides on the basic rule 226, runs in the basic rule long groove 236. The crotch forepart slide 244, has a groove 281, in which runs the crotch backpart slide front tongue 274.

The trouser forepart slide rule crotch backpart slide 246, shown in Figs. 3, 6, and 9, slides partly on the crotch forepart slide 244, and partly on the basic rule 226. The crotch backpart slide front tongue 274, slides in the crotch forepart slide groove 281, and the basic rule long groove 236. The crotch backpart slide front tongue 274, by butting to the crotch forepart slide front tongue 276, limits the motion of the crotch backpart slide 246, when it is moved in the direction of increasing measurement. The crotch backpart slide rear tongue 275, slides in the basic rule long groove 236 and helps to guide and hold the crotch backpart slide 246, to the rest of the mechanism Having mounted the three crotch line proportion slides 238, shown in Figs. 3, 6, 9, 10, 11, the seat width slide 239, is moved until mark 22 on the regular seat width proportion scale 240, coincides with the basic rule midway line 229. This establishes the position of the seat width slide seat width line edge 242, shown in Figs. 3 and 11. By marking along this edge, the seat width on the draft is established. If the trouser being drafted were a pleated one instead of a regular one, mark 22 on the pleated seat width proportion scale 241, would be made to coincide with the basic rule pleats midway line 230, on face "A," 283, to establish the seat width on the draft.

Next the crotch forepart slide 244, is moved until mark 22 on the crotch forepart slide dressing proportion scale 245, coincides with the seat width slide dressing scale matching edge 243. This establishes the position of the crotch forepart slide inseam run line edge 249. By marking along this edge, the draft forepart inseam run line is established. The crotch forepart slide inseam run line edge 249, serves also as the crotch backpart slide crotch proportion scale matching edge 249. By marking along the crotch forepart slide dressing take out edge 248, the draft dressing take out line is established. Next the crotch backpart slide 246, is moved until mark 22 on the crotch backpart slide crotch proportion scale 247, coincides with the crotch forepart slide inseam run line edge 249. This establishes the position of the crotch backpart slide inseam run line edge 250. By marking along this edge, the draft backpart inseam run line is established. After this, the trouser forepart drafting slide rule is removed.

Now the draft midway line 228, is constructed by drawing a line through the points where the basic rule midway line 229, intersected the draft finished length line 265, and the draft crotch line 266. The draft midway line 228 is drawn to intersect the draft waist line 268 also. In accordance with tailoring principles, the position of the draft seat line, along the draft construction line 1, is computed, and is drawn in at right angles to the draft construction line 1. The draft seat width line (prolongation of the seat width slide seat width line edge 242) is then extended to intersect the draft seat line. These lines are not shown on the drawings because they do not involve the use of the slide rule except as explained above.

Referring next, to Fig. 2, the basic rule 226, alone is so placed that the left edge 235 of the top face 283, coincides with the draft waist line 268, and the basic rule midway line 229, is at the intersection of the draft midway line 228, and the draft waist line 268. Since the waist measurement is 36, a check mark is placed at mark 18 on each of the scales of basic rule midway symmetrical proportion scale 227. This establishes the draft waist measurement. The basic rule 226 is then removed.

Referring next to Fig. 4, the basic rule 226, is so placed that the left edge 235, of the top face 283, coincides with the draft knee line 267, and the basic rule midway line 229 is at the intersection of the draft midway line 228 and the draft knee line 267. A check mark is placed at mark 24 on each of the scales of the basic rule midway symmetrical proportion scale 227. This establishes the draft knee measurement.

Referring next to Fig. 1, the trouser backpart height-with drafting slide rule, is composed of the scale bearing slide 251, and the V suppression slide 260. The V suppression slide 260 is shown also in Fig. 12. This slide rule functions mechanically as follows: The V suppression slide tongues 279, slide in the scale bearing slide grooves 278, causing the scale bearing slide 251, to move along the V suppression slide 260, by a rectilinear motion allowing the marks of the scale bearing slide V suppression scale 255, to pass by the V suppression slide V suppression scale matching line 261. Before placing the trouser backpart height-width drafting slide rule on the draft, the two slides are moved until the required mark on the scale bearing slide V suppression scale 255, coincides with the V suppression slide V suppression scale matching index line 261. In this position, the mark covers the line, and both appear as one line. In the case of the example being used, in Fig. 1, mark 22 on the scale bearing slide V suppression scale 255, is matching the V suppression slide V suppression scale matching index line 261.

To begin using the trouser backpart height-width drafting slide rule, the V suppression slide V suppression scale matching line 261, is matched with the required mark number on the scale bearing slide V suppression scale 255 (in this example, mark 22). In this relative position the two slides are placed on the draft with the V suppression slide 260, on the bottom and the scale bearing slide 251, on top of it. The two are moved over the draft until line 22 of the scale bearing slide back height proportion scale, 252, coincides with the draft waist line 268, and also the scale bearing slide midway line 253, coincides with the draft midway line 228. Next, line 22 of the scale bearing slide back width proportion scale 256, is prolonged until it intersects the draft construction line 1. The parallel lines of the scale bearing slide back width proportion scale 256, are the scale bearing slide backpart side seam run lines 259, for the various sizes of trousers, therefore the prolonged scale line becomes the draft backpart side seam run line 269. Line 22 of the scale bearing slide back height proportion scale 252, and line 22 of the scale bearing slide back width proportion scale 256, will intersect on the draft waist line 268. At the point of intersection a check mark is placed. A line is next marked along the following edges: scale bearing slide back joining edge 257, which is prolonged towards the draft crotch line 266; the scale bearing slide partial finished top edge 258; the V suppression slide partial finished top edge 264; and the V suppression cut out 262. The trouser backpart height-width slide rule may be removed after this.

When a pleated trouser is being drafted, the scale bearing slide pleats midway line 254 is made to coincide with the draft midway line 228, instead of the scale bearing slide midway line 253 which is used in this example because a regular trouser is being drafted.

By placing the V suppression slide 260 with the V suppression slide crotch line shaper edge 263, extending from the prolonged line (made by marking along the scale bearing slide back joining edge 257) to the draft crotch line 266, and drawing along the shaper edge, the draft back joining line 270 is established.

Referring next to Fig. 8 the bottom face 284, of the basic rule 226, is shown with the right edge 287 of the bottom face matching the draft waist line 268 and with the basic rule pleats midway line 230, matching the draft midway line 228, only at the point where the draft midway line 228, intersects the draft waist line 268. When a pleated trouser is being drafted, the draft midway line 228, is located by employing the basic rule pleats midway line 230, on the top face 283, instead of the basic rule midway line 229, on the top face 283. Therefore when the waist forepart measurement is to be laid out, the bottom face 284, of the basic rule 226, is used at the draft forepart waist line 268, instead of the top face 283.

Having located the basic rule the bottom face 284, as explained above, a check mark is placed on the draft waist line 268 opposite the required number of each of the scales of the basic rule bottom face unsymmetrical pleated waist proportion scale 286, to establish the draft waist measurement. Next the location of the large pleats fold, at the draft waist line 268 is accomplished by putting a check mark on the draft waist line 268 where it is intersected by the basic rule large pleat fold allowance lines 282, and at the intersection by the draft midway line 228. The location of the small pleats fold at the draft waist line 268, is accomplished by putting a check mark on the draft waist line 268, where the basic rule small pleats fold allowance lines 285 cross it.

Referring next to Fig. 12, is shown the trouser backpart height-width drafting slide rule V suppression index slide 260. The V suppression lines 289 marked on the slide, mark out the size and shape of the V suppression; and the V suppression cut out 262, provides edges along the V suppression index lines 289 along which can be marked on the draft the size and shape of the V suppression. The V suppression scale matching index line 261, is for matching with the markings on the scale bearing slide V supression scale 255. The V suppression partial finished top index edge 264, is that part of the trouser top as outlined by the V suppression slide 260. The V suppression slide tongues 279, which project upwards for fitting into the scale bearing slide grooves 278, shown in Fig. 1, determines the path of the moving slides with respect to each other. The fly-notch 288, is an indentation in the V suppression slide 260, located at the proper distance from the right end of the crotch line shaper edge 263, such that if a check mark is put on the draft at this notch, the fly joining point of the two parts of the trousers will be established.

After this the slide rule is not needed. The tailor then connects the points and lines established, in order to complete the draft.

In general in Figs. 13 and 14 the scales and points being used at the various points in the draft will be indicated by a check mark at the designated place. The out-line of the trouser not produced by direct tracing along the instrument is shown by dash line. Parts of the instrument make up the balance of the contour and other design features.

Referring to Fig. 13, the forepart, the opaque rectangular rule 226 with face "A" showing is placed along the finished length line 265 with its similar scales 227 along the line 265 and line 22 of the midway determination proportion scale 231 coinciding with the construction line 1. A check is placed at 19½ of each of the similar scales 227, at the intersection of line 265 and the regular midway line 229 of rule 226, and at line 22 of scale 231. Rule 226 may now be moved to the crotch line 266. With face "A" showing rule 226 is placed at line 266 so that the edge having the side front proportion scale 232 coincides with line 266 and line 22 of scale 232 coincides with line 1. A check is placed at line 22 of scale 232 and at the intersection of line 229 and line 266. Rule 226 is removed and used to draw the draft midway line 228 extending from the finished length line 265 to beyond the waist line 268. Rule 226 is then placed along the knee line 267 with face "A" showing and its edge having the similar scales 227 coinciding with line 267. Rule 226 is moved along line 267 until the regular midway line 229 of rule 226 coincides with the draft midway line 228 where it intersects line 267. A check is placed at the intersection of line 267, 229, and 228, and at line 24 of each of the similar scales 227. Rule 226 is now placed again at line 266 with face "A" showing and adjusted there as it was the first time it was placed there. The crotch line slides 239, 244, and 246 are now mounted on rule 226. Slide 246 could be left off because it is used only on the back part draft. The seat width slide 239 is moved until line 22 of its regular seat width scale 240 coincides with the regular midway line 229 of rule 226. A check is placed at this coincidence. Next the crotch forepart slide 244 is moved until line 22 of its dressing proportion scale 245 coincides with the dressing scale matching edge 243. A check is placed at this coincidence. A check is placed at the intersection of the forepart inseam run line edge 249 and line 266, and at the intersection of the forepart dressing take out edge 248 and line 266. Edge 249 is prolonged into the left check mark on the knee line 267. The check point at edge 248 is also drawn into the left check mark at line 267. A check is placed at the intersection of line 266 and edges 243 and the seat width line edge 242. These two check points are later extended to the waist line, part of the extension becoming part of the back joining lines of the forepart. Rule 226 is now placed at the waist line 268 with face "A" showing. Its regular midway line 229 is matched with line 228 where line 228 intersects line 268. A check is placed at this intersection. A check is also placed at the intersection of line 268 and line 18 of each of the similar scales 227. Now check marks at edges 243 and 242 at crotch line 266 are extended into the left check mark at waist line 268. With the V suppression slide 260 the right check mark at waist line 268 is worked into the construction line 1 by tracing along the edge of slide 260. Line 1 coincides with part of the right edge of the draft for some distance. From check marks at edges 249 and 248 at line 266 slide 260 shapes the back joining into the seat width lines from check marks at edges 243 and 242, by tracing along the curved edge of slide 260. The fly notch 288 of slide 260 is checked off on the back joining lines.

Referring to Fig. 14, the backpart at lines 265 and 267 no instrument is shown because at these lines the procedure is just a repetition of the work on the forepart in Fig. 13. Rule 226 with face "A" showing is placed at line 266 so that its edge having scale 232 coincides with line 266. Rule 226 is moved along line 266 until line 22 of the sideback proportion scale 233 coincides with the construction line 1. A check is placed at the intersection of line 266 and line 229 to establish a second point for the draft midway line 228. The crotch line slides are now mounted and slide 239 is moved until line 22 of its scale 240 coincides with line 229. A check is placed at this coincidence. Slide 244 is moved until line 22 of its scale 245 coincides with edge 243. Place a check at this coincidence. The crotch backpart slide 246 is moved until line 22 of its backpart crotch proportion scale 247 coincides with the forepart inseam run line edge 249 which also serves as the scale matching line. A check is put at this coincidence. A check is placed at the intersection of line 266 and the backpart inseam run line 250, also at its other extremity. A check is placed at the intersection of line 266 and edge 248. Edge 250 is prolonged to intersect line 267 and extended from there parallel to the left dashline between line 267 and 265. Rule 226 and the crotch line slides may now be removed. At the waist line 268 the scale bearing slide 251 and the V suppression slide 260 are placed on line 268 in such a way that index line 261 of the V suppression slide 260 coincides with line 22 of the V suppression scale 255 of the scale bearing slide 251, while line 22 of the height proportion scale 252 of the scale bearing slide 251 coincides with line 268, and the regular midway line 253 of slide 251 coincides with the draft midway line 228. A tracing is made of the backjoining edge 257, the partial finished top edges 258 and 264 and the V suppression cut out 262. The V suppression lines 289 are prolonged until they intersect to form a V. Line 22 of the back width proportion scale 256 is prolonged to intersect line 266 and then extended parallel to the right dash line between lines 267 and 265. Edge 257 is prolonged. The slide rule may now be removed from line 268. The V suppression slide 260 is placed with the beginning of its curve at the prolongation of edge 257 and a lower part of its curve passing through the check point at edge 248. A tracing is made along the curve of slide 260 from the prolongation of edge 257 to intersect edge 250. The fly joining point 288 is checked. This completes the draft.

Modifications in the composition, configuration, and disposition of the component elements that make-up the invention as a whole, is possible by those skilled in the art, therefore, no limitation is intended by the phraseology of the foregoing specification or the illustrations accompanying the drawing.

We claim:

1. In a trouser drafting slide rule, a trouser forepart drafting slide rule that comprises: three relatively dependent crotch line transparent slides telescopically mounted one on the other, said three transparent slides being slidably mounted on an opaque rectangular bottom or base rule wider and longer than any of the three slides, said bottom opaque rectangular rule having two long closed grooves in line cut through the center of the rule and running parallel to the long axis of the bottom rule, a short closed groove parallel to and nearly opposite one long closed groove, said long grooves cooperating with prongs of the three crotch line slides, and said short groove and one long groove also serving as windows through which marks are made along the indicia of a scale inscribed on one edge of the short closed groove and of a long groove, said bottom rectangular rule having a top face and a bottom face each inscribed differently, said top face being used exclusively for drafting a regular trouser, and said bottom face being used in addition to said top face when drafting a pleated trouser, said top face having along one of its long edges two similar scales equidistant from a solid index line across the face and perpendicular to the long edge, said solid index line indicating the location of the trouser midway line for regular design, said two similar scales being used for measuring the width of all trousers at the ankle or finished length line, the knee line, the crotch line, and for regular trousers only at the waist line, said top face having along its other long edge another solid index line drawn halfway across the face and parallel and close to the solid index line drawn completely across the face, for indicating the location of the trouser midway line for pleated trouser, said other long edge having also a scale opposite the two short grooves for determining at the crotch line the location of the midway line for regular design, a scale along the short groove closer to the ruler edge having one scale for determining the position of the midway line for pleated design at the crotch line and for the trouser back part, a scale along the short groove in line with the long groove for determining at the ankle or finished length line the location of the midway line for regular and pleated design, said bottom face having along one of its long edges a solid line marked across the face perpendicular to the long edge for matching with the pleats midway line at the waist line of the forepart, two similar scales unequally distant from the said solid line perpendicular to the long edge for measuring at the waist line the width of the forepart of a pleated trouser, two parallel dash lines parallel to the solid line perpendicular to the long edge located between said solid line perpendicular to the long edge and the scale opposite the long groove for indicating the position of the wide pleats at the waist line of the forepart, and three substantially parallel solid lines obliquely inclined to the ruler long edge and located between the solid line perpendicular to the long edge and the scale opposite the short grooves for indicating at the waist line of the forepart the position and direction of the small pleats for pleated design.

2. In a trouser drafting slide rule, a trouser forepart drafting slide rule as in claim 1 including a first crotch line elongated transparent seat width slide slidably mounted directly on said top face of the opaque bottom or base rectangular rule, and having a scale along one of its two long edges for matching with the regular midway line for measuring at the crotch line the seat width of a regular trouser, said scale located at one end and terminating near the same end of the slide, another scale along its other long edge located opposite the first mentioned scale but terminating at the same end of the slide as the first mentioned scale, said scale terminating at the end of the slide being used for matching with the pleats midway line for measuring at the crotch line the seat width of a pleated trouser, a rectangular extension perpendicularly extending from the slide's long edge having the scale for matching with the pleats midway line, said rectangular extension being located near the end of the slide opposite the end having the scales, said rectangular extension having its edge closest to the scales used as an index edge for indicating the location of the seat width limit for both regular and pleated trousers by cooperating with the scales on the slide, said rectangular extension having its edge farthest from the scales projected as a line across the face of the slide whereby the edge and said line serve as an index line for matching with the indicia of a dressing scale on the second crotch line slide mounted on the first crotch line slide, a closed longitudinal groove in the center running most of the length of the slide for receiving and controlling other members mounted on the slide, two tongues extending downward from the underside, one each of said tongues located in the center at each end of the slide for engaging the opaque rectangular bottom rule.

3. In a trouser drafting slide rule, a trouser forepart drafting slide rule as in claim 2 including a second crotch line transparent T-shaped crotch forepart slide slidably mounted on a first transparent crotch line seat width slide slidably mounted on said top face of the opaque bottom or base rectangular rule, said second crotch line transparent T-shaped crotch forepart slide comprised of a longitudinal stem cut square at one end and oblique at the other, a crosspiece with its ends cut square to one of its other long edges, its other long edge cut at the same oblique angle as the oblique end of the stem, said crosspiece being of the same thickness as the first crotch line slide and having a tongue extending downward from its underside, said stem being rigidly attached in a parallel plane to the top of the crosspiece with its oblique end in line with the long oblique edge of the crosspiece thereby making the other long edge of the crosspiece perpendicular to the long axis of the stem and forming a vertical edge under the stem, said stem having two closed grooves in line through its center, one of said two closed grooves extending from the crosspiece to a tongue on the stem in line with said two closed grooves and the other of said two closed grooves extending from the stem tongue to near the square end of the stem, said stem having a tongue extending downward from its underside, and a scale with indicia marked across its face near its square end, said scale when matched with an index line of a first crotch line slide measuring the dressing for the forepart, said crosspiece's long edge perpendicular to the long axis of the stem being an index edge for indicating the location of the forepart dressing take out, said oblique long edge of the crosspiece being a scale matching edge for matching with the backpart width scale of the third crotch line slide and being also the index edge for indicating the location and direction for the forepart inseam run line, said crosspiece tongue and said stem tongue serving to engage a first crotch line slide and the bottom opaque rectangular rule, said two closed grooves serving to receive and control a third crotch line slide, said crosspiece of the second crotch line T-shaped slide being longer than the width of the opaque bottom or base rectangular rule thereby overextending both sides of the opaque bottom rule as it slides upon it in the same plane as a first crotch line slide while said stem of the second crotch line slide slides on top of a first crotch line slide, said stem being narrower than a first crotch line slide.

4. In a trouser drafting slide rule, a trouser forepart drafting slide rule as in claim 3 including a third crotch line transparent T-shaped crotch backpart slide slidably mounted on the second crotch line slide slidably mounted on the first crotch line slide slidably mounted on said top face of the opaque bottom rectangular rule, said third crotch line transparent T-shaped crotch backpart slide comprised of an elongated stem narrower than a stem of the second crotch line slide, and a crosspiece longer than the width of the opaque rectangular bottom rule, said narrower stem of the third crotch line T-shaped slide being cut square at one end and oblique at the other, said crosspiece of the third crotch line T-shaped slide having its two long edges cut obliquely to its two short edges, the angle of obliquity of one long edge being the same as the angle of obliquity of a long oblique edge of the crosspiece of the second crotch line slide, the other long oblique edge of the crosspiece of the third crotch line slide having the same angle of obliquity as the oblique end of the stem of the third crotch line slide, said crosspiece of the third crotch line slide being of the same thickness as the crosspiece of the second crotch line slide and having a tongue in its middle extending downwards from its underside, said narrower stem of the third crotch line slide having near its square end a tongue in its middle extending downward from its underside and a scale near its crosspiece, said scale having the lines of its indicia marked across the stem at the same angle of obliquity as an oblique long edge of the crosspiece of the second crotch line slide whereby the indicia lines can be matched with the said oblique long edge of the crosspiece of the second crotch line slide for measuring the crotch width of the trouser backpart, said crosspiece of the third crotch line slide having a built up piece of the same thickness as the stem of the second crotch line slide at the place where the stem of the third crotch line slide is rigidly fastened to it thereby providing clearance or space underneath for the second crotch line slide to move in, said crosspiece and stem of the third crotch line slide being so joined that the oblique end of the stem is in line with the similar oblique long edge of the crosspiece forming a T, said similar oblique long edge in line with the oblique end of the third crotch line slide stem being used as an index edge for indicating the location and direction of the backpart crotch inseam run line, said tongues of the crosspiece and stem of the third crotch line slide being used for engaging the second and first crotch line slides and the opaque bottom rectangular rule, said first, second and third crotch line slides being connected by their tongues in a tandem arrangement whereby the second slide travels behind the first slide and the third slide travels behind the second slide when they are pulled in the direction of their long axis, the two crosspieces and the first crotch line seat width slide sliding in the same plane directly on said top face of the opaque bottom rectangular rule while the stem of the second crotch line crotch forepart slide slides directly on the first crotch line slide and the stem of the third crotch line crotch backpart slide slides directly on the stem of the second crotch line slide.

References Cited in the file of this patent

UNITED STATES PATENTS

| | | |
|---|---|---|
| 52,951 | Beard | Mar. 6, 1866 |
| 98,618 | Ordway | Jan. 4, 1870 |
| 1,190,941 | Needham | July 11, 1916 |
| 1,314,085 | Mastrangelo | Aug. 26, 1919 |
| 1,667,646 | Zingali | Apr. 24, 1928 |
| 1,763,091 | Cangemi | June 10, 1930 |
| 1,993,347 | McMillan | Mar. 15, 1935 |
| 2,214,408 | Arizpe | Sept. 10, 1940 |
| 2,364,529 | Hill | Dec. 5, 1944 |
| 2,589,525 | Absher | Mar. 18, 1952 |

FOREIGN PATENTS

| | | |
|---|---|---|
| 13,109 | Great Britain | Aug. 20, 1889 |

UNITED STATES PATENT OFFICE

CERTIFICATE OF CORRECTION

Patent No. 2,818,649 January 7, 1958

Aage T. Kolthoff et al.

It is hereby certified that error appears in the printed specification of the above numbered patent requiring correction and that the said Letters Patent should read as corrected below.

Column 1, line 34, for "slid" read -- slide --; column 3, line 7, for "in seam" read -- inseam --; line 40, for "slide" read -- side --; column 4, line 48, after "mechanism" insert a period; column 6, line 49, strike out "index" and insert the same after "suppression" in line 50, same column.

Signed and sealed this 9th day of December 1958.

(SEAL)
Attest:

KARL H. AXLINE
Attesting Officer

ROBERT C. WATSON
Commissioner of Patents